UNITED STATES PATENT OFFICE.

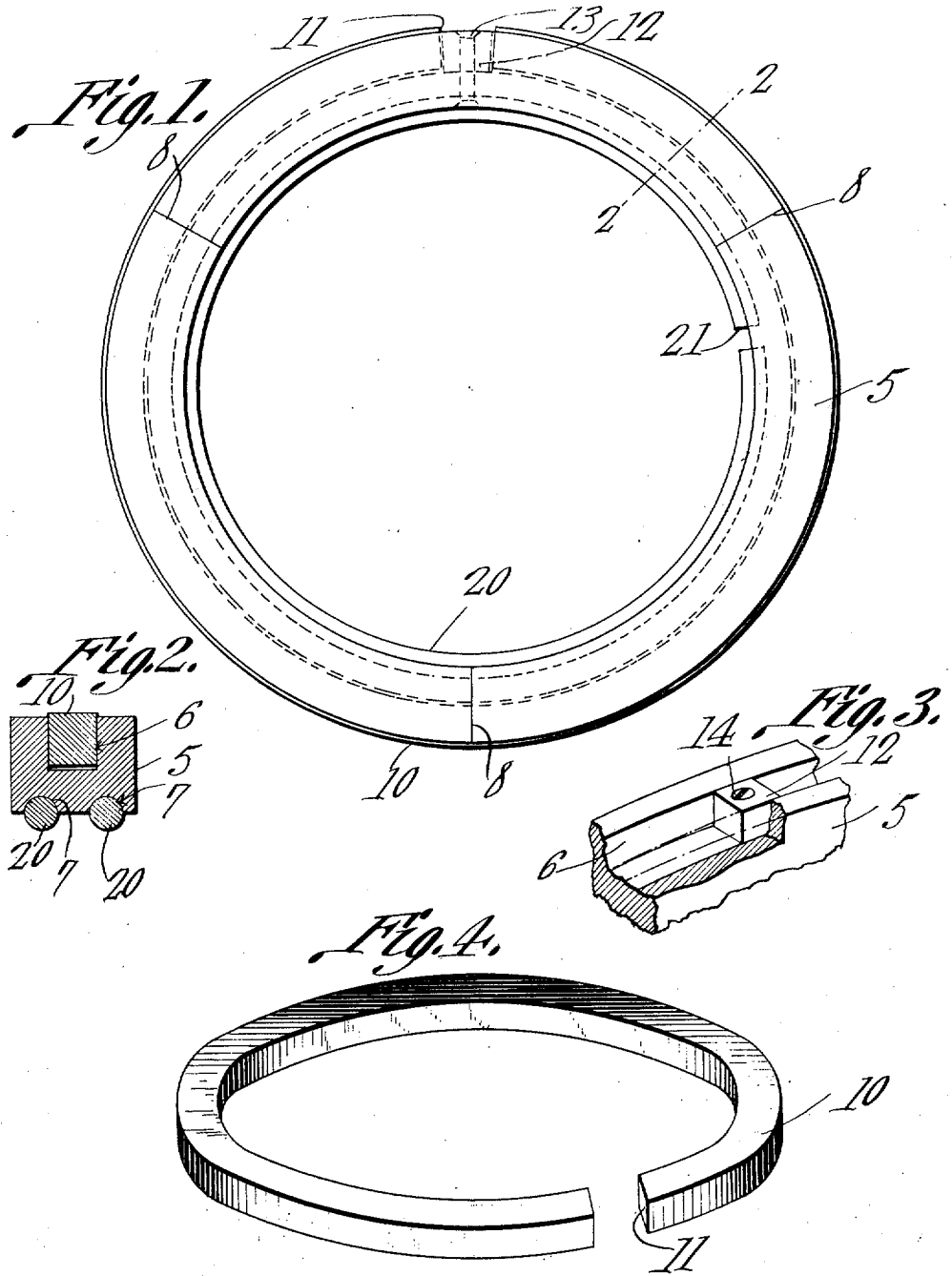

CHARLES H. STEVES, OF GRAND RAPIDS, MICHIGAN, ASSIGNOR OF ONE-HALF TO ANDREW E. PETERSON, OF GRAND RAPIDS, MICHIGAN.

PACKING-RING.

988,833.        Specification of Letters Patent.      Patented Apr. 4, 1911.

Application filed January 7, 1911. Serial No. 601,471.

*To all whom it may concern:*

Be it known that I, CHARLES H. STEVES, a citizen of the United States, residing at Grand Rapids, in the county of Kent and State of Michigan, have invented a new and useful Packing-Ring, of which the following is a specification.

This invention relates to steam engines, and more especially to the packing rings used therein; and the object of the same is to produce a packing ring which may be used either within a cylinder or around a piston and which will not leak steam.

To this end the invention consists in the details of construction hereinafter more fully described and claimed and as shown in the drawings wherein—

Figure 1 is a side elevation of this ring complete. Fig. 2 is a cross section through the same. Fig. 3 is a detailed perspective view, with one side partly broken away. Fig. 4 is a perspective detail of the entire ring.

This improved ring is made of three independent members, all of metal, one of which is made of a plurality of sections disposed end to end in a circle, and another of which may be made in duplicate as explained below.

The main or body member 5 is substantially rectangular in cross section as seen in Fig. 2, with a right angular groove 6 of considerable depth cut in its outer face and one or by preference two semicircular grooves 7 cut in its inner face. This member is made in sections, preferably three in number as indicated in Fig. 1, disposed end to end with their extremities adapted to almost meet at the points 8.

The outer or contractile member 10 is a rectangular strip of metal of a cross section to fit rather closely within the groove 6, the whole being formed into a ring, and split at one point as indicated at 11 in Fig. 1, and its normal tendency being to contract around the body member 5. Its length is such that when it does so contract its ends will almost meet at the point 11. Within the groove 6 I dispose a block 12 held therein by rivets 13, or in some cases by a screw 14 as shown in Fig. 3; and this block is of a size and shape to fit between the adjacent ends of the split ring 10 and to distend them when it is drawn into place, so that the outer edge of the ring will project slightly beyond the outer face of the main ring 5.

The third element of this packing ring is an expansive split ring 20, preferably round in cross section so that it will fit nicely in the groove 7 in the inner face of the main ring 5, and of such length that its ends will not quite touch each other at the point 21 when it is sprung into place. By preference I employ two of these rings as best seen in Fig. 2, and of course the main ring has two grooves 7 to accommodate them. When in place their ends break joint with each other, they are out of register and break joint with the end 11 of the outer contractile ring 10, and all these joints break joint with the meeting points 8 between the sections of the main ring. The size of parts is immaterial, and the use of a plurality of the inner rings is optional.

In assembling the elements of this improved packing ring, the sections of the main ring are laid end to end in a circle, the outer ring is sprung open and snapped in the groove 6, its ends separated and the block 12 inserted, and finally the inner ring or rings are compressed and snapped into the inner groove or grooves; and the whole is then ready for use. When applied to the groove around a piston, it is obvious that all parts can be spread apart slightly and slipped into the groove. When applied to the groove within a cylinder, it may be found necessary to put the outer ring 10 in place first, then the main ring, and finally the expansive inner ring; and possibly to insert the screw 14 so that it can be applied from the interior. But in either case, the use of this improved packing ring will be the same as those now applied. I have found by experiment that its life is much longer, that the leakage of steam passage is infinitesimal, and that the movability of its several parts permits it to adapt itself to grooves within the cylinder or around the piston to a greater degree than if any of the parts were rigid. The contractibility of the outer ring and the expansibility of the inner ring or rings serve to hold the sections of the body ring properly alined with each other.

What is claimed as new is:—

1. A packing ring comprising a body ring made in sections standing end to end and grooved along their outer and inner faces, a contractile ring in the outer groove split at one point, and an expansible ring extending around the body ring and lying within its inner groove and split at one point, the splits in these rings breaking joint with the points between the sections of the body ring.

2. In a packing ring, the combination with a body ring made in sections standing end to end and grooved along their outer and inner faces; of an expansible ring within the inner groove, a contractile ring within the outer groove split at a point out of line with the meeting ends between said sections, a block within said outer groove between the ends of the split ring, and a radial screw through the block into the body ring.

In testimony that I claim the foregoing as my own, I have hereto affixed my signature in the presence of two witnesses.

CHAS. H. STEVES.

Witnesses:
ANDREW E. PETERSON,
GEORGE B. POWELL.